United States Patent
Li

(10) Patent No.: US 10,256,562 B2
(45) Date of Patent: Apr. 9, 2019

(54) CONNECTOR AND COMMUNICATIONS TERMINAL

(71) Applicant: Huawei Technologies Co., Ltd., Shenzhen (CN)

(72) Inventor: Guangdong Li, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/738,998

(22) PCT Filed: Sep. 25, 2015

(86) PCT No.: PCT/CN2015/090697
§ 371 (c)(1),
(2) Date: Dec. 21, 2017

(87) PCT Pub. No.: WO2017/049581
PCT Pub. Date: Mar. 30, 2017

(65) Prior Publication Data
US 2018/0175533 A1    Jun. 21, 2018

(51) Int. Cl.
*H01R 13/24* (2006.01)
*G04G 19/00* (2006.01)
(Continued)

(52) U.S. Cl.
CPC ............ *H01R 13/24* (2013.01); *C23F 13/20* (2013.01); *G04G 19/00* (2013.01); *H01R 13/405* (2013.01);
(Continued)

(58) Field of Classification Search
CPC .................. H01R 13/2421; H01R 12/714
(Continued)

(56) References Cited

U.S. PATENT DOCUMENTS 3,259,870 A * 7/1966 Winkler ................. H01R 13/28
174/50
3,794,957 A * 2/1974 Winkler ................. H01R 13/28
439/170
(Continued)

FOREIGN PATENT DOCUMENTS

CN          1960067 A      5/2007
CN        101170225 A      4/2008
(Continued)

OTHER PUBLICATIONS

Machine Translation and Abstract of Chinese Publication No. CN204538334, Aug. 5, 2015, 14 pages.
(Continued)

*Primary Examiner* — Ross N Gushi
(74) *Attorney, Agent, or Firm* — Conley Rose, P.C.

(57) ABSTRACT

A connector and a communications terminal, where an enclosure of the connector is provided with a first positioning hole for fastening a volt current condenser (VCC) terminal, a second positioning hole for fastening a ground (GND) terminal, a third positioning hole for fastening a data positive (D+) data transmission terminal, and a fourth positioning hole for fastening a data negative (D−) data transmission terminal. At least one of a hole depth of the first positioning hole or a hole depth of the second positioning hole is different from a hole depth of the third positioning hole and is different from a hole depth of the fourth positioning hole. At least one of a length of the VCC terminal or a length of the GND terminal is different from a length of the D+ data transmission terminal and is different from a length of the D− data transmission terminal.

19 Claims, 6 Drawing Sheets

(51) Int. Cl.
*H01R 13/405* (2006.01)
*C23F 13/20* (2006.01)
*H01R 13/52* (2006.01)
*H01R 13/62* (2006.01)
*H02J 7/00* (2006.01)

(52) U.S. Cl.
CPC .......... *H01R 13/52* (2013.01); *H01R 13/6205* (2013.01); *H02J 2007/0062* (2013.01)

(58) Field of Classification Search
USPC .............................................. 439/285, 924.1
See application file for complete search history.

(56) References Cited

U.S. PATENT DOCUMENTS

| | | | |
|---|---|---|---|
| 7,833,026 | B1 | 11/2010 | Morgan et al. |
| 2007/0099512 | A1 | 5/2007 | Sato |
| 2007/0202730 | A1 | 8/2007 | Ikeya et al. |
| 2009/0042447 | A1 | 2/2009 | Sato |
| 2016/0261065 | A1 | 9/2016 | Chen et al. |

FOREIGN PATENT DOCUMENTS

| | | |
|---|---|---|
| CN | 102646882 A | 8/2012 |
| CN | 202930625 U | 5/2013 |
| CN | 104868321 A | 8/2015 |
| CN | 204538334 U | 8/2015 |
| EP | 2453275 A1 | 5/2012 |
| JP | S49104173 A | 10/1974 |
| JP | 2002134227 A | 5/2002 |
| JP | 2007207727 A | 8/2007 |
| JP | 2010192140 A | 9/2010 |
| TW | M501006 U | 5/2015 |
| WO | 2011153054 A2 | 12/2011 |
| WO | 2014109165 A1 | 7/2014 |

OTHER PUBLICATIONS

Machine Translation and Abstract of International Publication No. WO2014109165, Jul. 17, 2014, 17 pages.
Foreign Communication From a Counterpart Application, European Application No. 15904457.7, Extended European Search Report dated Mar. 6, 2018, 10 pages.
Machine Translation and Abstract of Chinese Publication No. CN104868321, Aug. 26, 2015, 19 pages.
Foreign Communication From a Counterpart Application, PCT Application No. PCT/CN2015/090697, English Translation of International Search Report dated May 27, 2016, 2 pages.
Machine Translation and Abstract of Chinese Publication No. CN102646882, Aug. 22, 2012, 19 pages.
Machine Translation and Abstract of Chinese Publication No. CN202930625, May 8, 2013, 12 pages.
Foreign Communication From a Counterpart Application, Chinese Application No. 201580025461.7, Chinese Office Action dated Jul. 3, 2018, 9 pages.
Machine Translation and Abstract of Japanese Publication No. JP2002134227, May 10, 2002, 21 pages.
Machine Translation and Abstract of Japanese Publication No. JP2010192140, Sep. 2, 2010, 9 pages.
Foreign Communication From a Counterpart Application, Korean Application No. 2017-565166, Notice of Reasons for Rejection dated Dec. 21, 2018, 4 pages.
Foreign Communication From a Counterpart Application, Korean Application No. 2017-565166, English Translation of Notice of Reasons for Rejection dated Jan. 8, 2019, 6 pages.

\* cited by examiner

CONNECTOR AND COMMUNICATIONS TERMINAL

CROSS-REFERENCE TO RELATED APPLICATION

This application is a U.S. National Stage of International Patent Application No. PCT/CN2015/090697 filed on Sep. 25, 2015, which is hereby incorporated by reference in its entirety.

TECHNICAL FIELD

The present disclosure relates to the field of communications technologies, and in particular, to a connector and a communications terminal.

BACKGROUND

At present, electronic products are generally provided with connectors, such as a charge terminal and a Universal Serial Bus (USB), for charging and signal transmission of the electronic products. The charge terminal is commonly used in a scenario in which a standard USB cannot be used to implement charging and signal transmission in place of the USB. A most common charge terminal has four pins, can implement both charging and signal transmission, and usually has four terminals: a volt current condenser (VCC) terminal, a data positive (D+) terminal, a data negative (D−), and a ground (GND) terminal. When there is water, sweat, or another conductive liquid between the VCC terminal and the other three terminals, the VCC terminal is electrolytically corroded during charging, or when there is water, sweat, or another conductive liquid between the D+ and GND terminals and/or between the D− and GND terminals, the D+ terminal and the D− terminal are electrolytically corroded during charging. In this case, an appearance and charging performance of a product are affected, and even the product may not be used any more due to serious corrosion. Such an electrolytic corrosion phenomenon is common in electronic products, particularly in wearable products (such as a headset, a sports bracelet, an electronic wristwatch, and the like products that are worn for a long time). Sizes of pins, spacing between the pins, and the like of an existing charge terminal are different. For example, heights of the four pins are generally designed to be the same, that is, the four pins are in one plane, as shown in FIG. 1. When there is a small amount of water, sweat, or another conductive liquid on a surface of the charge terminal, the four pins are connected and the pins are prone to be electrolytically corroded during charging.

At present, electrolytic corrosion is avoided generally by increasing spacing between the four terminals. However, a size of a terminal component structure is increased, an integration level is relatively low, and a requirement for miniaturizing electronic products cannot be satisfied.

SUMMARY

The present disclosure provides a connector and a communications terminal in order to resolve a problem of electrolytic corrosion in a connector while maintaining an integration level of the connector.

A first aspect of embodiments of the present disclosure provides a connector, where the connector includes a VCC terminal, a GND terminal, a D+ data transmission terminal, a D− data transmission terminal, and an enclosure, where the enclosure is provided with a first positioning hole for fastening the VCC terminal, a second positioning hole for fastening the GND terminal, a third positioning hole for fastening the D+ data transmission terminal, and a fourth positioning hole for fastening the D− data transmission terminal, at least one of a hole depth of the first positioning hole or a hole depth of the second positioning hole is different from a hole depth of the third positioning hole and is different from a hole depth of the fourth positioning hole, at least one of a length of the VCC terminal or a length of the GND terminal is different from a length of the D+ data transmission terminal and is different from a length of the D− data transmission terminal, and the hole depth of the first positioning hole is set corresponding to the length of the VCC terminal, and the hole depth of the second positioning hole is set corresponding to the length of the GND terminal.

With reference to the first aspect, in a first implementation manner of the first aspect of the present disclosure, the enclosure is further provided with a first protrusion and a second protrusion, where the first positioning hole is made into the first protrusion, the second positioning hole is made into the second protrusion, and a protrusion direction of the first protrusion is the same as a protrusion direction of the second protrusion. The first protrusion is located at an input end of the VCC terminal on the enclosure, and the second protrusion is located at an input end of the GND terminal on the enclosure. The hole depth of the first positioning hole is greater than the hole depth of the third positioning hole, the hole depth of the first positioning hole is greater than the hole depth of the fourth positioning hole, the hole depth of the second positioning hole is greater than the hole depth of the third positioning hole, and the hole depth of the second positioning hole is greater than the hole depth of the fourth positioning hole, and the length of the VCC terminal is greater than the length of the D+ data transmission terminal and the length of the D− data transmission terminal.

With reference to the first aspect, in a second implementation manner of the first aspect of the present disclosure, the enclosure is further provided with a third protrusion and a fourth protrusion, where the third positioning hole is made into the third protrusion, the fourth positioning hole is made into the fourth protrusion, and a protrusion direction of the third protrusion is the same as a protrusion direction of the fourth protrusion. The third protrusion is located at an input end of the D+ data transmission terminal on the enclosure, and the fourth protrusion is located at an input end of the D− data transmission terminal on the enclosure. The hole depth of the third positioning hole is greater than the hole depth of the first positioning hole, the hole depth of the third positioning hole is greater than the hole depth of the second positioning hole, the hole depth of the fourth positioning hole is greater than the hole depth of the first positioning hole, and the hole depth of the fourth positioning hole is greater than the hole depth of the second positioning hole, and the length of the VCC terminal is less than the length of the D+ data transmission terminal, the length of the VCC terminal is less than the length of the D− data transmission terminal, the length of the GND terminal is less than the length of the D+ data transmission terminal, and the length of the GND terminal is less than the length of the D− data transmission terminal.

With reference to the first aspect or the first or the second implementation manner of the first aspect, in a third implementation manner of the first aspect of the present disclosure, a difference between the length of the VCC terminal and the length of the D+ data transmission terminal ranges from 0.1 millimeter (mm) to 1.5 mm, or a difference between the length of the VCC terminal and the length of the D− data transmission terminal ranges from 0.1 mm to 1.5 mm, and a difference between the hole depth of the first positioning hole and the hole depth of the third positioning hole ranges from 0.1 mm to 1.5 mm, and a difference between the hole depth of the first positioning hole and the hole depth of the fourth positioning hole ranges from 0.1 mm to 1.5 mm.

With reference to any one of the first aspect or the first to the third implementation manners of the first aspect, in a fourth implementation manner of the first aspect of the present disclosure, a difference between the length of the GND terminal and the length of the D+ data transmission terminal ranges from 0.1 mm to 1.5 mm, or a difference between the length of the GND terminal and the length of the D− data transmission terminal ranges from 0.1 mm to 1.5 mm, and a difference between the hole depth of the second positioning hole and the hole depth of the third positioning hole ranges from 0.1 mm to 1.5 mm, and a difference between the hole depth of the second positioning hole and the hole depth of the fourth positioning hole ranges from 0.1 mm to 1.5 mm.

With reference to any one of the first aspect or the first to the fourth implementation manners of the first aspect, in a fifth implementation manner of the first aspect of the present disclosure, a non-metallic material is attached to all of an outer peripheral wall of a pin shaft tail end, extending outwardly from the enclosure, of the VCC terminal, an outer peripheral wall of a pin shaft tail end, extending outwardly from the enclosure, of the GND terminal, an outer peripheral wall of a pin shaft tail end, extending outwardly from the enclosure, of the D+ data transmission terminal, and an outer peripheral wall of a pin shaft tail end, extending outwardly from the enclosure, of the D− data transmission terminal.

A second aspect of the present disclosure provides a communications terminal, where the communications terminal includes the connector according to any one of the first aspect or the first to the fifth implementation manners of the first aspect.

In the embodiments of the present disclosure, a length of each terminal of the connector is modified such that at least one of a VCC terminal or a GND terminal is staggered from a D+ data transmission terminal and a D− data transmission terminal. This appropriate modification based on an actual product structure and shape can avoid electrolytic corrosion and effectively improve an integration level of electronic products without increasing considerable costs in order to meet a current requirement for miniaturizing the electronic products.

DESCRIPTION OF EMBODIMENTS

Figure 1:
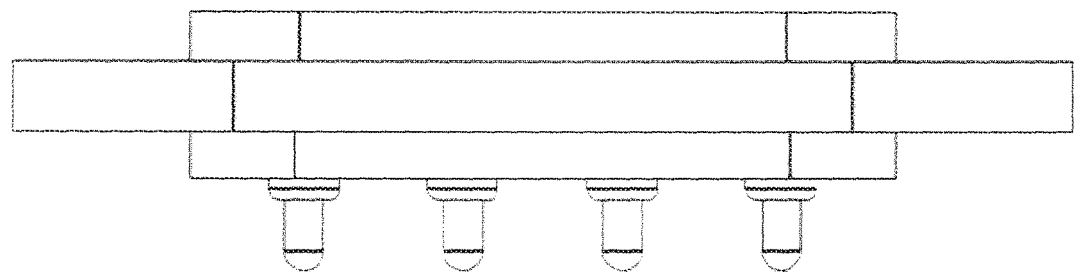
FIG. 1 is a structural diagram of a connector.

The following clearly describes the technical solutions in the embodiments of the present disclosure with reference to the accompanying drawings in the embodiments of the present disclosure. The described embodiments are a part rather than all of the embodiments of the present disclosure. All other embodiments obtained by a person of ordinary skill in the art based on the embodiments of the present disclosure without creative efforts shall fall within the protection scope of the present disclosure.

In the specification, claims, and accompanying drawings of the present disclosure, the terms "first," "second," and so on are intended to distinguish between similar objects but do not necessarily indicate a specific order or sequence. It should be understood that the data termed in such a way are interchangeable in proper circumstances so that the embodiments of the present disclosure described herein can be implemented in an order other than the order illustrated or described herein. In addition, the terms "include," "contain," and any variation thereof are intended to cover a non-exclusive inclusion, for example, a process, method, system, product, or device that includes a series of steps or modules is not necessarily limited to those steps or modules that are expressly listed, but may include other steps or modules not expressly listed or inherent to such a process, method, product, or device. The module division herein is merely logical division and may be other division in actual implementation. For example, a plurality of modules may be combined or integrated into another system, or some features may be ignored or not performed. In addition, the displayed or discussed mutual couplings or direct couplings or communication connections may be implemented using some interfaces. Indirect couplings or communication connections between the modules may be implemented in electronic or other forms. No limitation is imposed herein. In addition, the modules or sub-modules described as separate parts may or may not be physically separate, may or may not be physical modules, or may not be distributed on a plurality of circuit modules. Some or all of the modules may be selected according to actual needs to achieve the objectives of the solutions of the embodiments of the present disclosure.

The embodiments of the present disclosure provide a connector and a communications terminal for resolving a problem of electrolytic corrosion. The connector is mainly used for electronic products (for example, wearable devices such as GOOGLE GLASSES, sports bracelets, smart watches, or headsets), and may also be used for connector cables (at least one end of a connector cable may include the connector). A quantity of connectors on an electronic product, an arrangement of terminals on the connector, and a quantity of the terminals on the connector are not limited herein.

In other approaches, because a connector is basically of a flat bottom, after there is a conductive liquid on a surface of the connector due to long-time wearing, a loop, that is, an electrolytic environment, is prone to form between a VCC terminal and a GND terminal, or between a VCC terminal and a D+ data transmission terminal, or between a VCC terminal and a D− data transmission terminal, or between a GND terminal and a D+ data transmission terminal, or between a GND terminal and a D− data transmission terminal. This will cause electrolytic corrosion, affecting a charging or signal transmission function. In addition, a loop formed between the D+ data transmission terminal and the D− data transmission terminal also affects the charging and signal transmission functions.

In the present disclosure, the VCC terminal, the data terminals, and the GND terminal on the connector are separated by means of staggered arrangement to avoid electrolytic corrosion even when there is a conductive liquid on the connector of the electronic product.

Figure 2A:
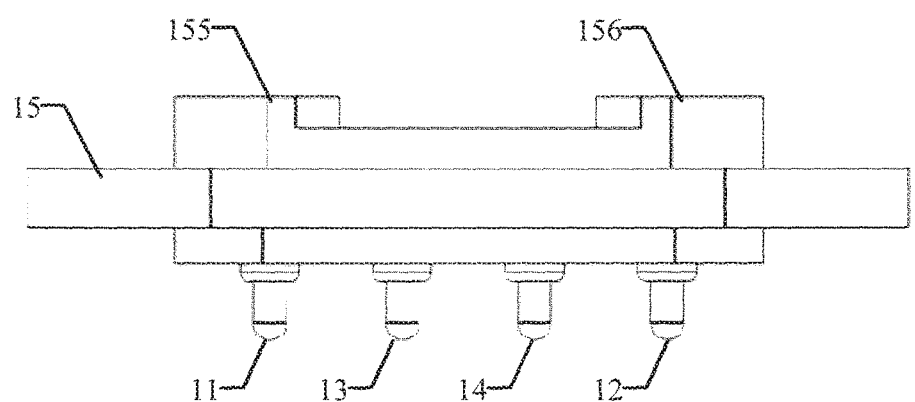
FIG. 2A is a side view of a connector according to an embodiment of the present disclosure.
Figure 2B:
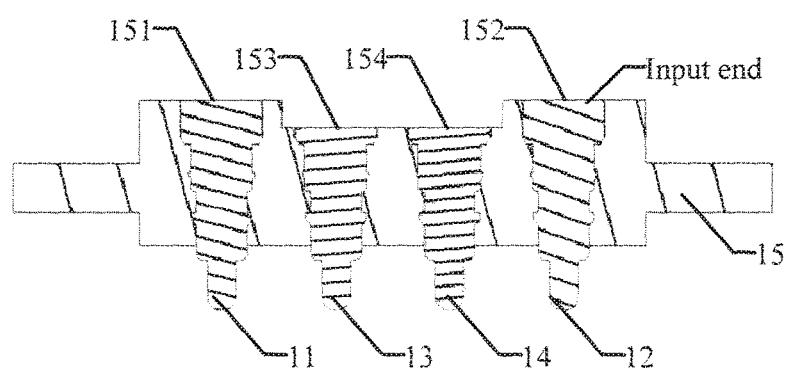
FIG. 2B is a side sectional view of a connector according to an embodiment of the present disclosure.
Figure 2C:
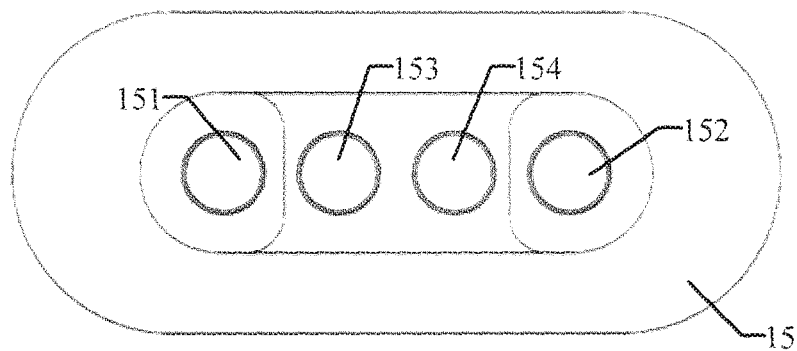
FIG. 2C is a top view of an enclosure according to an embodiment of the present disclosure.
Figure 2D:
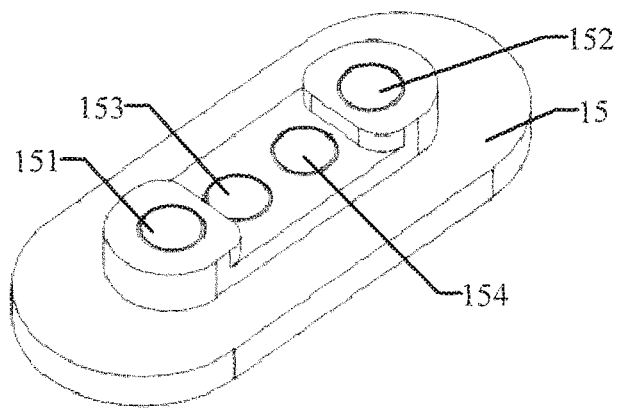
FIG. 2D is a side view of an enclosure according to an embodiment of the present disclosure.
Figure 2E:
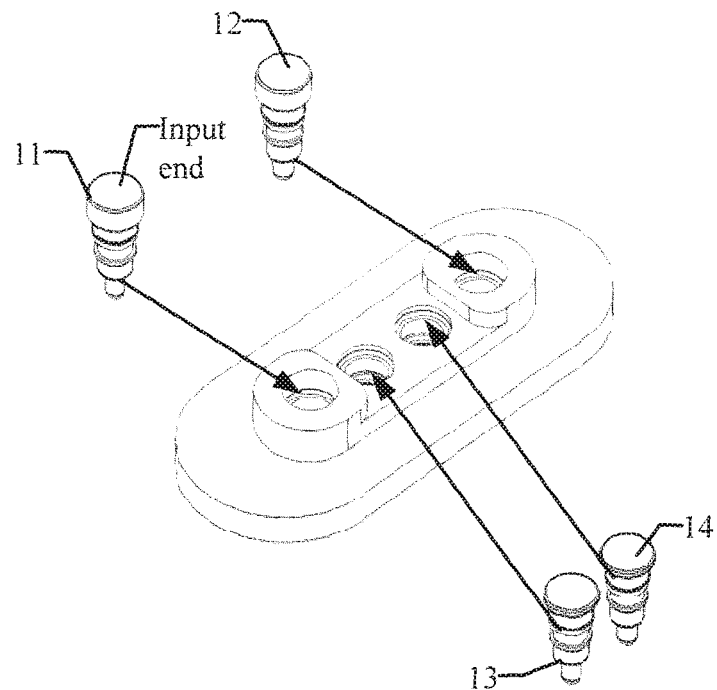
FIG. 2E is an assembly view of a connector according to an embodiment of the present disclosure.
Figure 3A:
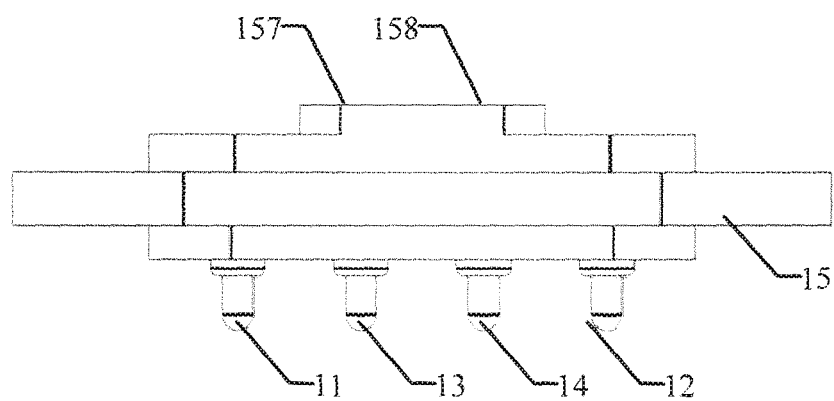
FIG. 3A is a side view of another connector according to an embodiment of the present disclosure.
Figure 3B:
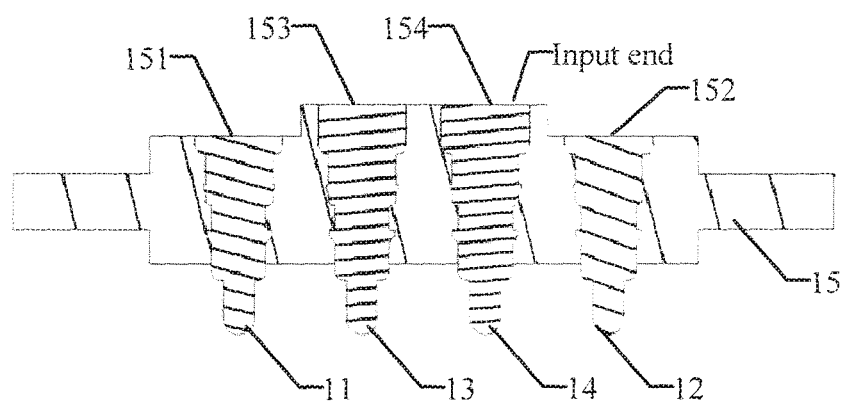
FIG. 3B is a side sectional view of another connector according to an embodiment of the present disclosure.
Figure 3C:
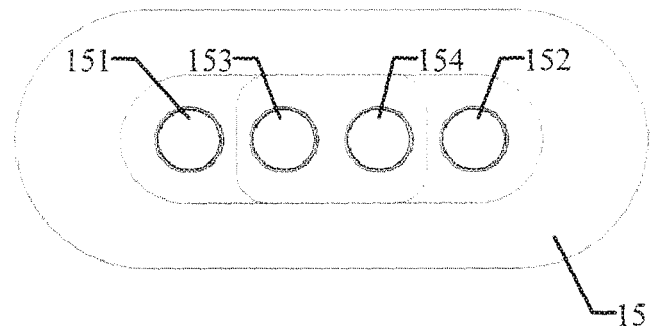
FIG. 3C is another top view of an enclosure according to an embodiment of the present disclosure.
Figure 3D:
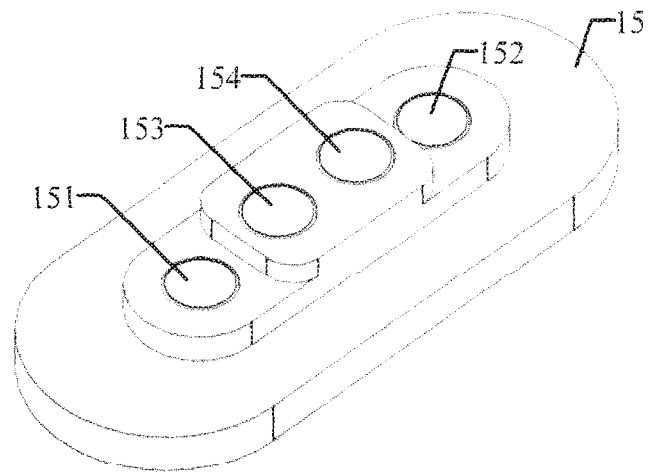
FIG. 3D is another side view of an enclosure according to an embodiment of the present disclosure.
Figure 3E:
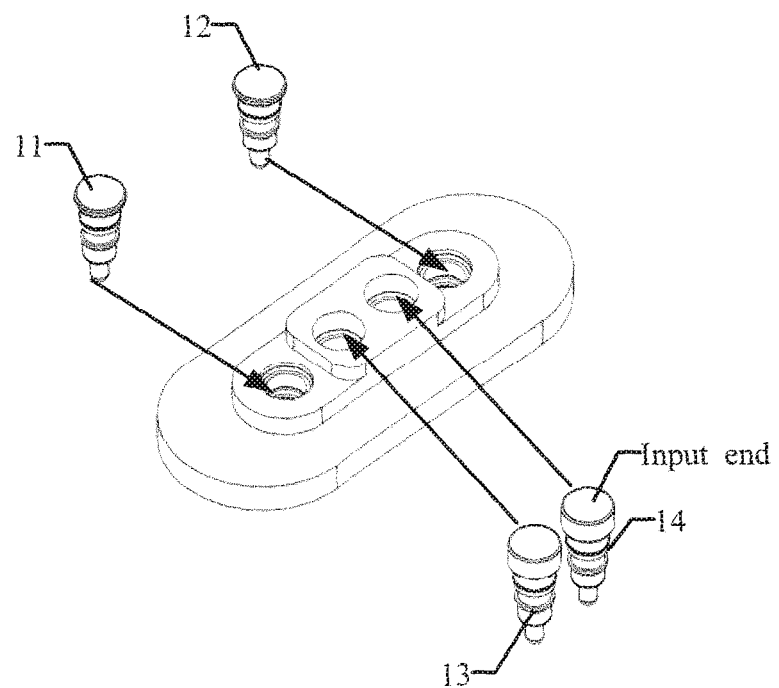
FIG. 3E is another assembly view of a connector according to an embodiment of the present disclosure.

Referring to FIG. 2A and FIG. 2B, a connector in an embodiment of the present disclosure is described, and the connector 1 includes a VCC terminal 11, a GND terminal 12, a D+ data transmission terminal 13, a D− data transmission terminal 14, and an enclosure 15.

The enclosure 15 is provided with a first positioning hole 151 for fastening the VCC terminal 11, a second positioning hole 152 for fastening the GND terminal 12, a third positioning hole 153 for fastening the D+ data transmission terminal 13, and a fourth positioning hole 154 for fastening the D− data transmission terminal 14. In actual production, these terminals may be fastened on and connected to the enclosure 15 by means of assembly or in-mold injection.

At least one of a hole depth of the first positioning hole 151 or a hole depth of the second positioning hole 152 is different from a hole depth of the third positioning hole 153 and is different from a hole depth of the fourth positioning hole 154.

At least one of a length of the VCC terminal 11 and a length of the GND terminal 12 is different from a length of the D+ data transmission terminal 13 and is different from a length of the D− data transmission terminal 14.

The hole depth of the first positioning hole 151 is set corresponding to the length of the VCC terminal 11, and the hole depth of the second positioning hole 152 is set corresponding to the length of the GND terminal 12.

The VCC terminal 11 is a solid terminal or a spring pin, and the GND terminal 12 is a solid terminal or a spring pin. A material of the enclosure 15 is a non-metal material.

In this embodiment of the present disclosure, a length of each terminal of the connector is modified such that at least one of the VCC terminal 11 or the GND terminal 12 is staggered from the D+ data transmission terminal 13 and the D− data transmission terminal 14, and at least one of the first positioning hole 151 or the second positioning hole 152 is staggered from the third positioning hole 153 to form a height difference or a step and avoid forming an electrolytic environment. This appropriate modification based on an actual product structure and shape can avoid electrolytic corrosion and effectively improve an integration level of electronic products without increasing considerable costs in order to meet a current requirement for miniaturizing the electronic products.

Optionally, in some embodiments of the present disclosure, only the VCC terminal 11 may be modified, or only the GND terminal 12 may be modified, or both the VCC terminal 11 and the GND terminal 12 are modified, or only the D+ data transmission terminal 13 is modified, or only the D− data transmission terminal 14 is modified, or both the D+ data transmission terminal 13 and the D− data transmission terminal 14 are modified. When a terminal is modified, an added length of the terminal is set corresponding to a depth of a positioning hole corresponding to the terminal. In addition, when two terminals are modified, lengths of the two terminals may be the same or different, depending on a product structure and shape. No limitation is imposed herein.

In this embodiment, how a problem of electrolytic corrosion is avoided is described using examples in which both the VCC terminal 11 and the GND terminal 12 are modified and both the D+ data transmission terminal 13 and the D− data transmission terminal 14 are modified are used as examples. Other cases are similar and are not repeated herein. Details are described as follows.

I. Referring to FIG. 2A to FIG. 2E, the VCC terminal 11 and the GND terminal 12 may be modified as follows.

The enclosure 15 is further provided with a first protrusion 155 and a second protrusion 156, the first positioning hole 151 is made into the first protrusion 155, the second positioning hole 152 is made into the second protrusion 156, and a protrusion direction of the first protrusion 155 is the same as a protrusion direction of the second protrusion 156.

The first protrusion 155 is located at an input end of the VCC terminal 11 on the enclosure 15, and the second protrusion 156 is located at an input end of the GND terminal 12 on the enclosure 15. The input end refers to an end, on the VCC terminal 11, that is in contact with the VCC terminal 11 when an external signal is input to the VCC terminal 11. Input ends of other terminals are similar to the input end of the VCC terminal 11.

The hole depth of the first positioning hole 151 is greater than the hole depth of the third positioning hole 153, the hole depth of the first positioning hole 151 is greater than the hole depth of the fourth positioning hole 154, the hole depth of the second positioning hole 152 is greater than the hole depth of the third positioning hole 153, and the hole depth of the second positioning hole 152 is greater than the hole depth of the fourth positioning hole 154.

The length of the VCC terminal 11 is greater than the length of the D+ data transmission terminal 13, and the length of the VCC terminal 11 is greater than the length of the D− data transmission terminal 14.

A length of the first positioning hole 151 that extends outwardly from the enclosure 15 is set corresponding to the length of the VCC terminal 11.

A length of the second positioning hole 152 that extends outwardly from the enclosure 15 is set corresponding to the length of the GND terminal 12.

In this case, the first positioning hole 151 is staggered from the third positioning hole 153, the first positioning hole 151 is staggered from the fourth positioning hole 154, the second positioning hole 152 is staggered from the third positioning hole 153, and the second positioning hole 152 is staggered from the fourth positioning hole 154 such that a height difference is formed between their respective terminals to avoid forming an electrolytic environment.

II. Referring to FIG. 3A to FIG. 3E, the D+ data transmission terminal 13 and the D− data transmission terminal 14 may be modified as follows.

The enclosure 15 is further provided with a third protrusion 157 and a fourth protrusion 158, the third positioning hole 153 is made into the third protrusion 157, the fourth positioning hole 154 is made into the fourth protrusion 158, and a protrusion direction of the third protrusion 157 is the same as a protrusion direction of the fourth protrusion 158.

The third protrusion 157 is located at an input end of the D+ data transmission terminal 13 on the enclosure 15, and the fourth protrusion 158 is located at an input end of the D− data transmission terminal 14 on the enclosure 15.

The hole depth of the third positioning hole 153 is greater than the hole depth of the first positioning hole 151, the hole depth of the third positioning hole 153 is greater than the hole depth of the second positioning hole 152, the hole depth of the fourth positioning hole 154 is greater than the hole depth of the first positioning hole 151, and the hole depth of the fourth positioning hole 154 is greater than the hole depth of the second positioning hole 152.

The length of the VCC terminal 11 is less than the length of the D+ data transmission terminal 13, the length of the VCC terminal 11 is less than the length of the D− data transmission terminal 14, the length of the GND terminal 12 is less than the length of the D+ data transmission terminal 13, and the length of the GND terminal 12 is less than the length of the D− data transmission terminal 14.

A length of the third positioning hole 153 that extends outwardly from the enclosure 15 is set corresponding to the length of the D+ data transmission terminal 13.

A length of the fourth positioning hole 154 that extends outwardly from the enclosure 15 is set corresponding to the length of the D− data transmission terminal 14.

In this case, the third positioning hole 153 is staggered from the first positioning hole 151, the third positioning hole 153 is staggered from the second positioning hole 152, the fourth positioning hole 154 is staggered from the first positioning hole 151, and the fourth positioning hole 154 is staggered from the second positioning hole 152 such that a height difference is formed between their respective terminals to avoid forming an electrolytic environment.

According to the foregoing two solutions, the foregoing types of terminals can be effectively separated by simply modifying the related terminals and/or the enclosure, without needing to disassemble the connector into a plurality of components. Through the appropriate modification based on an actual product structure and shape, the product shape does not need to be changed, costs are not increased, and an integration level of electronic products can be effectively increased in order to meet a current requirement for miniaturizing the electronic products.

Optionally, in some embodiments of the present disclosure, on the basis of only modifying terminals without changing a structure of the enclosure 15, the four terminals may also be separated using a non-metallic material to avoid electrolytic corrosion. Details are described as follows.

Portions, connected to the enclosure 15, of the VCC terminal 11, the GND terminal 12, the D+ data transmission terminal 13, and the D− data transmission terminal 14 are covered by a non-metallic material. The portions may be covered completely or partially, provided that a separation effect is achieved. In addition, a bottom of a pin shaft tail end of each terminal does not need to be covered by the non-metallic material.

Optionally, a non-metallic material is attached to an outer peripheral wall of a pin shaft tail end, extending outwardly from the enclosure 15, of the VCC terminal 11, an outer peripheral wall of a pin shaft tail end, extending outwardly from the enclosure 15, of the GND terminal 12, an outer peripheral wall of a pin shaft tail end, extending outwardly from the enclosure 15, of the D+ data transmission terminal 13, and an outer peripheral wall of a pin shaft tail end, extending outwardly from the enclosure 15, the D− data transmission terminal 14.

Optionally, when the VCC terminal 11 and the GND terminal 12 are modified, or the D+ data transmission terminal 13 and the D− data transmission terminal 14 are modified, a same length may be increased for the VCC terminal 11 and the GND terminal 12 to meet a product aesthetic demand, when the actual product structure or shape is changed, different lengths may be increased for the VCC terminal 11 and the GND terminal 12, and a length of each terminal is set corresponding to a hole depth of a positioning hole, that is, an added length is the same as an added hole depth.

A relationship between the length of the VCC terminal 11, the depths of the first to fourth positioning holes, the length of the GND terminal 12, the length of the D+ data transmission terminal 13, or the length of the D− data transmission terminal 14 includes at least one of the following.

1. A difference between the length of the VCC terminal 11 and the length of the D+ data transmission terminal 13 ranges from 0.1 mm to 1.5 mm, or a difference between the length of the VCC terminal 11 and the length of the D− data transmission terminal 14 ranges from 0.1 mm to 1.5 mm.

A difference between the hole depth of the first positioning hole 151 and the hole depth of the third positioning hole 153 ranges from 0.1 mm to 1.5 mm, and a difference between the hole depth of the first positioning hole 151 and the hole depth of the fourth positioning hole 154 ranges from 0.1 mm to 1.5 mm.

2. A difference between the length of the GND terminal 12 and the length of the D+ data transmission terminal 13 ranges from 0.1 mm to 1.5 mm, or a difference between the length of the GND terminal 12 and the length of the D− data transmission terminal 14 ranges from 0.1 mm to 1.5 mm.

A difference between the hole depth of the second positioning hole 152 and the hole depth of the third positioning hole 153 ranges from 0.1 mm to 1.5 mm, and a difference between the hole depth of the second positioning 152 hole and the hole depth of the fourth positioning hole 154 ranges from 0.1 mm to 1.5 mm.

Figure 4A:
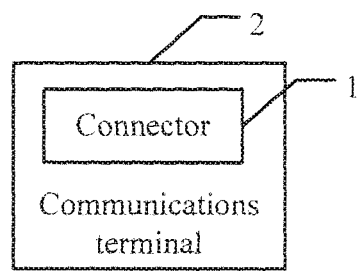
FIG. 4A is a structural diagram of a communications terminal according to an embodiment of the present disclosure.
Figure 4B:
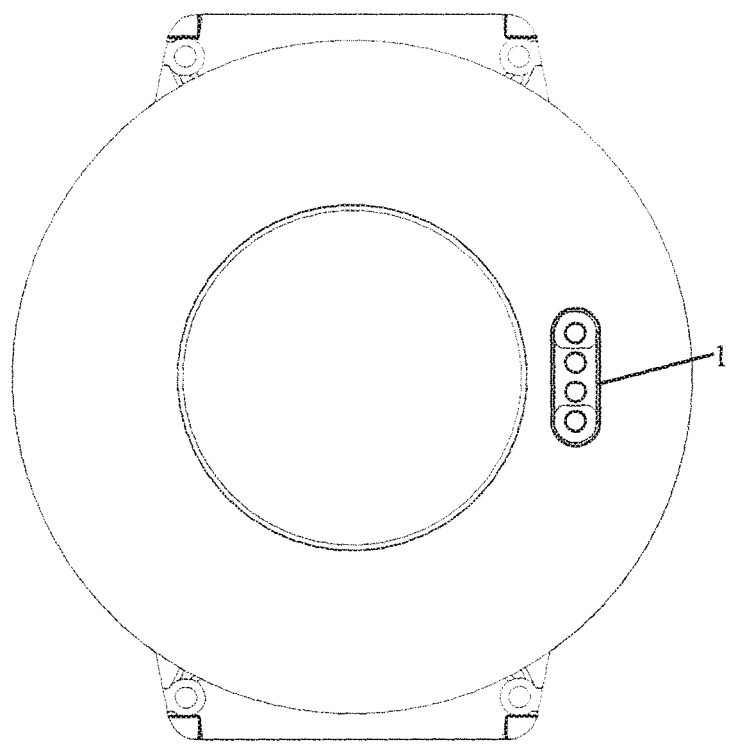
FIG. 4B is a structural diagram of another communications terminal according to an embodiment of the present disclosure.

Referring to FIG. 4A and FIG. 4B, a communications terminal in the present disclosure is described, and the communications terminal 2 includes the connector 1 described in any one of FIG. 2A to FIG. 3E.

FIG. 4B is a rear view of a smart watch. In FIG. 4B, only that a VCC terminal and a GND terminal are modified is used as an example. Other structures are similar. A specific structure is determined based on actual product design.

In the foregoing embodiments, the description of each embodiment has respective focuses. For a part that is not described in detail in an embodiment, reference may be made to related descriptions in other embodiments.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present disclosure essentially, or the part contributing to the other approaches, or all or some of the technical solutions may be implemented in the form of a software product. The software product is stored in a storage medium and includes several instructions for instructing a computer device (which may be a personal computer, a server, or a network device) to perform all or some of the steps of the methods described in the embodiments of the present disclosure. The foregoing storage medium includes any medium that can store program code, such as a USB flash drive, a removable hard disk, a read-only memory (ROM), a random access memory (RAM), a magnetic disk, or an optical disc.

The connector and the communications terminal provided in the present disclosure are described in detail above. The principle and implementation of the present disclosure are described herein through specific examples. The description about the foregoing embodiments is merely provided to help understand the method and core ideas of the present disclosure. In addition, a person of ordinary skill in the art can make variations and modifications to the present disclosure in terms of the specific implementations and application scopes according to the ideas of the present disclosure. Therefore, the content of specification shall not be construed as a limit to the present disclosure.

What is claimed is:

1. A connector, comprising:
   a volt current condenser (VCC) terminal;
   a ground (GND) terminal;
   a data positive (D+) data transmission terminal;
   a data negative (D−) data transmission terminal;
   an enclosure, wherein the enclosure comprises a first positioning hole for fastening the VCC terminal, a second positioning hole for fastening the GND terminal, a third positioning hole for fastening the D+ data transmission terminal, and a fourth positioning hole for fastening the D− data transmission terminal, wherein the VCC terminal, the GND terminal, the D+ data transmission terminal, and the D− data transmission terminal each comprise an outer peripheral wall of a pin shaft tail end, extending outward from the enclosure; and
   a non-metallic material attached to all of the outer peripheral walls of the pin shaft tail ends,
   wherein at least one of a hole depth of the first positioning hole or a hole depth of the second positioning hole is different from a hole depth of the third positioning hole and a hole depth of the fourth positioning hole,
   wherein at least one of a length of the VCC terminal or a length of the GND terminal is different from a length of the D+ data transmission terminal and a length of the D− data transmission terminal;
   wherein the hole depth of the first positioning hole is set corresponding to the length of the VCC terminal, and
   wherein the hole depth of the second positioning hole is set corresponding to the length of the GND terminal.

2. The connector according to claim 1, wherein the enclosure further comprises a first protrusion and a second protrusion, wherein the first protrusion comprises the first positioning hole, wherein the second protrusion comprises the second positioning hole, wherein a protrusion direction of the first protrusion is the same as a protrusion direction of the second protrusion, wherein the first protrusion is located at an input end of the VCC terminal on the enclosure, wherein the second protrusion is located at an input end of the GND terminal on the enclosure, wherein the hole depth of the first positioning hole is greater than the hole depth of the third positioning hole, wherein the hole depth of the first positioning hole is greater than the hole depth of the fourth positioning hole, wherein the hole depth of the second positioning hole is greater than the hole depth of the third positioning hole, wherein the hole depth of the second positioning hole is greater than the hole depth of the fourth positioning hole, wherein the length of the VCC terminal is greater than the length of the D+ data transmission terminal, and wherein the length of the VCC terminal is greater than the length of the D− data transmission terminal.

3. The connector according to claim 1, wherein the first positioning hole is staggered from the third positioning hole in different planes of the enclosure such that a height difference is formed between the VCC terminal and the D+ data transmission terminal, respectively.

4. The connector according to claim 1, wherein the second positioning hole is staggered from the fourth positioning hole in different planes of the enclosure such that a height difference is formed between the GND terminal and the D− data transmission terminal, respectively.

5. The connector according to claim 1, wherein the enclosure further comprises a first protrusion and a second protrusion, wherein the first protrusion comprises the third positioning hole, wherein the second protrusion comprises the fourth positioning hole, wherein a protrusion direction of the first protrusion is the same as a protrusion direction of the second protrusion, wherein the first protrusion is located at an input end of the D+ data transmission terminal on the enclosure, wherein the second protrusion is located at an input end of the D− data transmission terminal on the enclosure, wherein the hole depth of the third positioning hole is greater than the hole depth of the first positioning hole, wherein the hole depth of the third positioning hole is greater than the hole depth of the second positioning hole, wherein the hole depth of the fourth positioning hole is greater than the hole depth of the first positioning hole, wherein the hole depth of the fourth positioning hole is greater than the hole depth of the second positioning hole, wherein the length of the VCC terminal is less than the length of the D+ data transmission terminal and the length of the D− data transmission terminal, and wherein the length of the GND terminal is less than the length of the D+ data transmission terminal and the length of the D− data transmission terminal length.

6. The connector according to claim 5, wherein the third positioning hole is staggered from the first positioning hole such that a step on the enclosure is formed between the input end of the D+ data transmission terminal and an input end of the VCC terminal, respectively.

7. The connector according to claim 5, wherein the fourth positioning hole is staggered from the second positioning hole such that a step on the enclosure is formed between the input end of the D− data transmission terminal and an input end of the GND terminal, respectively.

8. The connector according to claim 1, wherein a difference between the length of the VCC terminal and the length of the D+ data transmission terminal ranges from 0.1 millimeter (mm) to 1.5 mm or a difference between the length of the VCC terminal and the length of the D− data transmission terminal ranges from 0.1 mm to 1.5 mm, wherein a difference between the hole depth of the first positioning hole and the hole depth of the third positioning hole ranges from 0.1 mm to 1.5 mm, and wherein a difference between the hole depth of the first positioning hole and the hole depth of the fourth positioning hole ranges from 0.1 mm to 1.5 mm.

9. The connector according to claim 1, wherein a difference between the length of the GND terminal and the length of the D+ data transmission terminal ranges from 0.1 millimeter (mm) to 1.5 mm or a difference between the length of the GND terminal and the length of the D− data transmission terminal ranges from 0.1 mm to 1.5 mm, wherein a difference between the hole depth of the second positioning hole and the hole depth of the third positioning hole ranges from 0.1 mm to 1.5 mm, and wherein a difference between the hole depth of the second positioning hole and the hole depth of the fourth positioning hole ranges from 0.1 mm to 1.5 mm.

10. The connector according to claim 1, wherein the VCC terminal comprises a solid terminal or a spring pin, and wherein the GND terminal comprises another solid terminal or another spring pin.

11. The connector according to claim 1, wherein a material of the enclosure comprises a non-metallic material.

12. The connector according to claim 1, wherein the VCC terminal, the GND terminal, the D+ data transmission terminal, and the D− data transmission terminal are fastened on and coupled to the enclosure by assembly or in-mold injection.

13. A communications terminal, wherein the communications terminal comprises a connector, and wherein the connector comprises:
  a volt current condenser (VCC) terminal;
  a ground (GND) terminal;
  a data positive (D+) data transmission terminal;
  a data negative (D−) data transmission terminal;
  an enclosure, wherein the enclosure comprises a first positioning hole for fastening the VCC terminal, a second positioning hole for fastening the GND terminal, a third positioning hole for fastening the D+ data transmission terminal, and a fourth positioning hole for fastening the D− data transmission terminal, wherein the VCC terminal, the GND terminal, the D+ data transmission terminal, and the D− data transmission terminal each comprise an outer peripheral wall of a pin shaft tail end, extending outward from the enclosure; and
  a non-metallic material attached to all of the outer peripheral walls of the pin shaft tail ends,
  wherein at least one of a hole depth of the first positioning hole or a hole depth of the second positioning hole is different from a hole depth of the third positioning hole and a hole depth of the fourth positioning hole,
  wherein at least one of a length of the VCC terminal or a length of the GND terminal is different from a length of the D+ data transmission terminal and a length of the D− data transmission terminal,
  wherein the hole depth of the first positioning hole is set corresponding to the length of the VCC terminal, and
  wherein the hole depth of the second positioning hole is set corresponding to the length of the GND terminal.

14. The communications terminal according to claim 13, wherein the enclosure further comprises a first protrusion and a second protrusion, wherein the first protrusion comprises the first positioning hole, wherein the second protrusion comprises the second positioning hole, wherein a protrusion direction of the first protrusion is the same as a protrusion direction of the second protrusion, wherein the first protrusion is located at an input end of the VCC terminal on the enclosure, wherein the second protrusion is located at an input end of the GND terminal on the enclosure, wherein the hole depth of the first positioning hole is greater than the hole depth of the third positioning hole, wherein the hole depth of the first positioning hole is greater than the hole depth of the fourth positioning hole, wherein the hole depth of the second positioning hole is greater than the hole depth of the third positioning hole, wherein the hole depth of the second positioning hole is greater than the hole depth of the fourth positioning hole, wherein the length of the VCC terminal is greater than the length of the D+ data transmission terminal, and wherein the length of the VCC terminal is greater than the length of the D− data transmission terminal.

15. The communications terminal according to claim 13, wherein the first positioning hole is staggered from the third positioning hole in different planes of the enclosure such that a height difference is formed between the VCC terminal and the D+ data transmission terminal, respectively.

16. The communications terminal according to claim 13, wherein the second positioning hole is staggered from the third positioning hole in different planes of the enclosure such that a height difference is formed between the GND terminal and the D− data transmission terminal, respectively.

17. The communications terminal according to claim 13, wherein the enclosure further comprises a first protrusion and a second protrusion, wherein the first protrusion comprises the third positioning hole, wherein the second protrusion comprises the fourth positioning hole, wherein a protrusion direction of the first protrusion is the same as a protrusion direction of the second protrusion, wherein the first protrusion is located at an input end of the D+ data transmission terminal on the enclosure, wherein the second protrusion is located at an input end of the D− data transmission terminal on the enclosure, wherein the hole depth of the third positioning hole is greater than the hole depth of the first positioning hole, wherein the hole depth of the third positioning hole is greater than the hole depth of the second positioning hole, wherein the hole depth of the fourth positioning hole is greater than the hole depth of the first positioning hole, wherein the hole depth of the fourth positioning hole is greater than the hole depth of the second positioning hole, wherein the length of the VCC terminal is less than the length of the D+ data transmission terminal and the length of the D− data transmission terminal, and wherein the length of the GND terminal is less than the length of the D+ data transmission terminal and the length of the D− data transmission terminal length.

18. The communications terminal according to claim 17, wherein the third positioning hole is staggered from the first positioning hole such that a step on the enclosure is formed between the input end of the D+ data transmission terminal and an input end of the VCC terminal, respectively.

19. The communications terminal according to claim 17, wherein the fourth positioning hole is staggered from the second positioning hole such that a step on the enclosure is formed between the input end of the D− data transmission terminal and an input end of the GND terminal, respectively.

\* \* \* \* \*